United States Patent [19]
Montgomery et al.

[11] Patent Number: 4,986,446
[45] Date of Patent: Jan. 22, 1991

[54] SERVICE STATION IMPROVEMENTS

[75] Inventors: Jerry A. Montgomery; Larry S. Parkhurst, both of Houston, Tex.

[73] Assignee: Southwest Canopy Company, Houston, Tex.

[21] Appl. No.: 444,403

[22] Filed: Dec. 1, 1989

Related U.S. Application Data

[63] Continuation-in-part of Ser. No. 228,733, Aug. 5, 1988, abandoned.

[51] Int. Cl.⁵ ............................................. B67D 5/64
[52] U.S. Cl. ...................................... 222/94; 222/105; 222/135; 222/173; 137/234.6
[58] Field of Search ................. 222/94, 105, 135, 173, 222/129, 183, 132; 52/194; 220/1 B, 85 B; 211/71, 85; 141/369; 137/343, 356, 363, 234.6

[56] References Cited
U.S. PATENT DOCUMENTS 2,002,777  5/1935  Johnson ........................... 137/234.6
2,021,544 11/1935  Crown ................................ 222/132
3,747,800  7/1973  Viland ................................ 220/856
4,696,186  9/1987  Sharp ................................ 220/856
4,796,676  1/1989  Hendershot et al. ............... 220/856

FOREIGN PATENT DOCUMENTS 8501388 12/1985  Netherlands ...................... 222/173

Primary Examiner—Andres Kashnikow
Assistant Examiner—Gregory L. Huson
Attorney, Agent, or Firm—Bill B. Berryhill

[57] ABSTRACT

Service station for dispensing fuel to vehicles from fuel dispensers connected by fluid conduits to one or more fuel storage tanks characterized in that the fuel storage tanks are self-contained, flexible and collapsible bladder type tanks supported in an elevated position above the fuel dispensers and the vehicles to which fuel is to be dispensed. An open top containment vessel may also be supported at an elevated position and into which the bladder type tanks may be preferably lowered for non-attached disposition therein.

7 Claims, 1 Drawing Sheet

SERVICE STATION IMPROVEMENTS

Cross Reference to Related Application

This application is a continuation-in-part of U.S. application Ser. No. 07/228,733 filed Aug. 5, 1988, now abandoned.

Background of the Invention

1. Field of the Invention

The present invention pertains to service stations of the type for dispensing fuel to vehicles with internal combustion engines. More specifically, it pertains to improved construction of the fuel storage tanks for such service stations.

2. Description of the Prior Art

With the advent of the automobile, service stations were constructed to provide fuel and other services thereto. While many other services have been provided by such service stations, the primary function thereof is to dispense fuel to vehicles with internal combustion engines. This, of course, requires storage of substantial quantities of volatile fuels.

Automotive fuels are typically stored in underground storage tanks from which the fuel is pumped to a fuel dispenser for dispensing into an automobile. Such tanks are typically constructed of metal or fiberglass and must not only be capable of storing fuels, but also must be capable of withstanding the overburden of earth or vehicular traffic thereon. Underground installation, of course, requires relatively large excavations and coverage thereof. Furthermore, such installations are susceptible to a number of problems.

One of the problems associated with underground tanks is leakage. This is particularly true of metallic tanks which have been in the ground for many years. Due to corrosion or other causes, these tanks may begin to leak into the surrounding earth. Not only does this result in the loss of valuable fuel, it also results in environmental pollution and potentially explosive situations. The cost of repairing and replacing a leaking underground tank is relatively expensive and the cost of cleaning up an environmental leakage may be extremely expensive.

In some locations, due to rock, underground water or other earth conditions, it may be impossible to install an underground tank. If not impossible, it may be impractical or extremely expensive to do so. Netherlands Pat. No. 8501388 discloses a design which apparently addresses these problems.

Another problem associated with underground tanks is contamination of fuel therein due to water condensation. In such cases, not only is the fuel contaminated, the water may contribute to corrosion of the tank, resulting in eventual need of replacement.

Due to today's environmental concerns, it may be necessary to remove underground fuel storage tanks when no longer in use. Furthermore, it may be difficult, if not impossible, to sell the site of a service station after such station is no longer operative if the storage tanks are still in place. In fact, due to environmental concerns and liabilities therefor, it may be difficult to sell such sites even after the storage tanks have been removed. From the foregoing problems it can also be appreciated that insurance costs for service station facilities with underground fuel storage tanks may be extremely expensive or prohibitive due to the dangers and liabilities associated therewith.

Thus, while underground fuel storage tanks may have been acceptable in the past, they are fraught with potential problems and may in certain situations be totally unacceptable in today's environmentally conscious world. Even where they are acceptable, they are expensive to install, remove and replace. When used, they may result in product loss, product contamination, environmental pollution, high insurance costs, and other potential problems.

Summary of the Present Invention

In the present invention, a service station is provided which is characterized by fuel storage tanks which are supported at elevated positions above the fuel dispensers and vehicles to which fuel is to be dispensed. Such storage tanks are preferrably of the self-contained, collapsible bladder type which are constructed of tear and puncture resistant rubberized material. The storage tanks are also preferably disposed within but not attached to at least one containment vessel which is also supported at an elevated position. In fact, both the storage tanks and containment vessel may be enclosed within the overhead canopy covering the area where fuel is being dispensed to vehicles. Vapor detectors may be installed in the canopy to detect any fuel leakage from the storage tanks.

Such overhead storage construction is cheaper and safer in many ways. Initially, such construction is faster and cheaper. It is also much easier and cheaper to remove or replace such overhead storage tanks since the tanks are totally accessible without having to remove any concrete or dig up any soil.

Due to the construction leakage containment, vapor detection and the fact that the tanks are not installed in the ground, ground contamination and environmental cleanup problems are essentially eliminated. Furthermore, the problems associated with the requirement of storage tank removal, upon cessation of use, by digging up underground tanks is eliminated.

The construction of the present invention, utilizing collapsible bladder type tanks results in very little if any product contamination due to condensation. Furthermore, loss of product due to vapor loss is minimized. Any vapor loss is easily monitored and detected.

Last, but not least, liability insurance costs may be substantially reduced as compared to underground fuel storage tanks. Many other objects and advantages of the invention will be understood from reading the description which follows in conjunction with the accompanying drawings.

Description of a Preferred Embodiment

Figure 1:
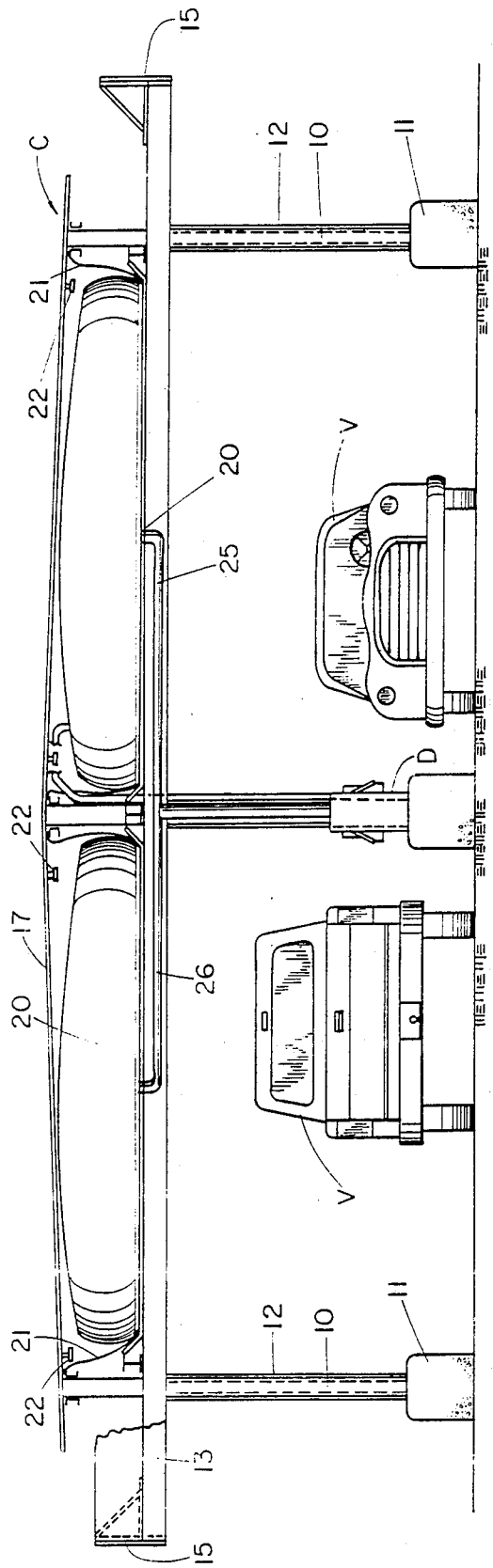
FIG. 1 is an elevation view of a service station, partially in cross-section showing the area where fuel is being dispensed from fuel dispensers to automobiles, such area being covered by an overhead canopy.
Figure 2:
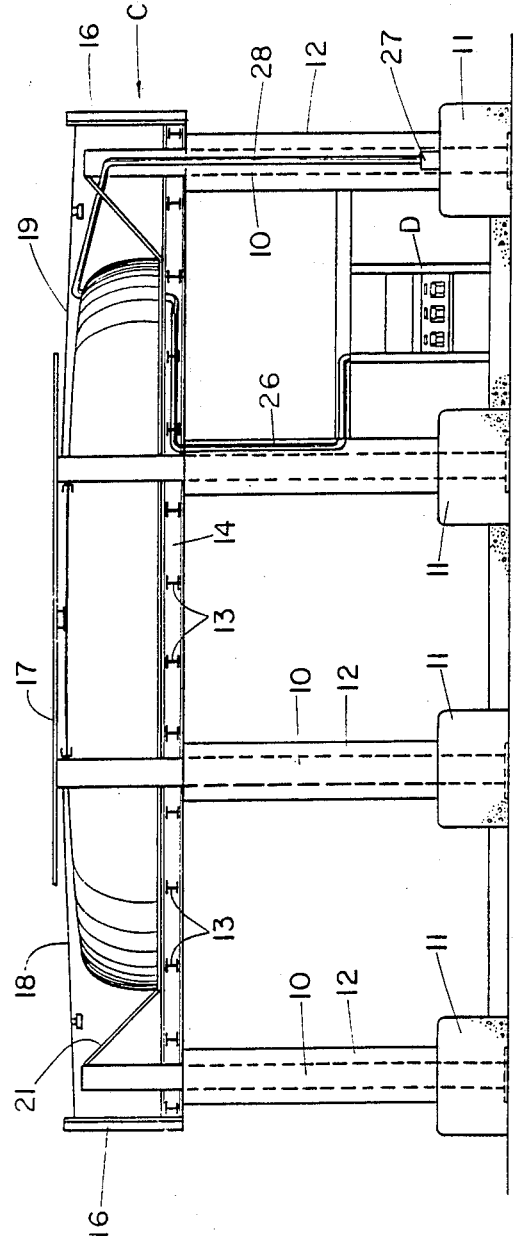
FIG. 2 is a cross-sectional view of FIG. 1, illustrating the location of a fuel dispenser therein.

Referring now to FIGS. 1 and 2, there is shown a service station for dispensing fuel to vehicles such as the vehicles V shown in FIG. 1. Fuel is dispensed to the vehicles V from typical fuel dispensers D (best shown in FIG. 2). The service station depicted is of the type having an overhead canopy C covering the area where fuel is being dispensed to the vehicles V.

The canopy C is supported by structural columns 10 at the lower end of which are concrete bases 11. The columns 10 may also provide support for various piping elements and may be surrounded by some sort of protective covering or wrapping 12.

A service station, of course, requires some sort of fuel storage. In the preferred embodiment, fuel storage is provided by one or more bladder type tanks 20. Bladder type tanks are known in the prior art, having been used in a variety of operations many of which are portable. However, they do not appear to have been used in conventional service stations and particularly in an elevated position such as shown in FIGS. and 2. Bladder tanks 20 are fabricated from rubberized tear and puncture resistant flexible material which allows the tanks to expand when filled with fuel and to collapse when the fuel is dispensed therefrom. The material is selected from materials which are inert to the fuel stored therein. These bladder tanks 20 are self-contained and self-supported, i.e. they do not require any other support such as a surrounding wall of any type. They are extremely light and when empty may be rolled up, easily lifted and transported. For example, a ten thousand gallon bladder tank would weigh approximately 375 pounds as compared to 10,500 pounds for a ten thousand gallon steel tank.

The tanks 20 are preferably disposed within at least one containment vessel 21. The bladder tanks 20 are not attached to the containment vessel and, when empty, can be easily lowered into or removed therefrom. The containment vessel 21 may actually be made of a flexible material itself though it must be of a fluidtight material. Although the containment vessels 21 may be opened at the tops thereof, they are capable of containing any fuel leakage due to a puncture or tear in the storage tanks 20. Some safety and governmental regulations may require the volume of the containment vessels 21 to be somewhat greater than the bladder tanks 20, i.e. 1.3 times as much.

The containment vessels 21 and bladder tanks 20 are supported on structural beams 13, 14 which are, in turn, supported by the columns 10. Typically, some sort of ceiling material is attached underneath beams 13 and 14 to provide an attractive ceiling for the canopy C. In addition, side panels 15 and 16 provide an attractive finish to the canopy C and may also serve for display of the company logo or the like. Sheeting material 17, 18 and 19 may provide a roof or covering for the canopy C, protecting the tanks 20 from the direct exposure to the elements.

The tanks 20 are connected to the dispensers D by the necessary product piping 25, 26 which may be carried along the beams 13, 14 and the area of columns 10. In addition, the necessary pumps 27 and piping 28 may be provided for supplying fuel to the tanks 20 from transport trucks. Spark arresters and other protective equipment may be provided as needed.

As noted, the fuel tanks 20 are essentially enclosed by components of the overhead canopy C. Secondary containment is attained from containment vessels 21. Vapor detectors 22 are provided to detect a loss of any vapors from tanks 20.

The installation of fuel storage tanks at the elevated positions shown in FIGS. 1 and 2 is quite unique to the industry. Such an installation utilizing conventional tank materials of the prior art might have been considered hazardous. However, with the advent of new materials such as those utilized in bladder type tanks, quite the contrary is true. In fact, this installation is actually safer than service stations utilizing conventional underground tanks. Since the bladder type tanks collapse, as fuel is dispensed therefrom, almost no vapor space is present therein. Furthermore, the presence of vapors outside of the bladder tank is continuously monitored.

In addition to the reduction or elimination of vapor problems, the unique elevated fuel tank of the present invention eliminates potential ground contamination and the costs associated with environmental cleanup. It is cheaper and faster to construct such a facility. This type of construction permits location of service stations in sites which would not accomodate underground storage tanks, i.e. rock formations, water near the surface, etc.

There is almost no product loss and no product contamination from condensation which normally occurs from underground storage tanks. The overhead fuel tanks are totally accessible for testing, inspecting, repairing or replacing. In addition, such installation lends itself to portability. The entire canopy area of the service station may be easily dismantled, transported and reerrected on another site.

Thus, the unique elevated fuel storage construction of the present invention results in an extremely safe and efficient operation. Its construction and eventual removal, if necessary, is much easier and cheaper. Product loss and contamination is minimized. The risk of environmental pollution, loss of land value and other hazards are reduced. This should also result in reduced insurance costs.

While a single embodiment of the invention has been described herein, it is obvious that many variations can be made without departing from the spirit of the invention. Accordingly, it is intended that the scope of the invention be limited only by the claims which follow.

We claim:

1. A service station for dispensing fuel to vehicles, said service station having fuel dispensers connected by fluid conduits to fuel storage means, said station being characterized in that said fuel storage means comprises at least one self-supported, self-contained, flexible and collapsible bladder type tank and an open top containment vessel into which said bladder type tank may be lowered for nonattached disposition so that any leakage due to a puncture in said bladder type tank would be totally contained by said containment vessel, said bladder type tank and said containment vessel being installed in an elevated position above said fuel dispensers and the vehicles to which fuel is to be dispensed.

2. A service station as set forth in claim 1 in which said bladder type tank and containment vessel are supported in said elevated position by structural support elements.

3. A service station as set forth in claim 1 in which said bladder type tank is fabricated from rubberized tear and puncture resistant flexible material which allows said tank to independently collapse as fuel is dispensed therefrom, reducing the vapor space therein.

4. A service station as set forth in claim 1 in which a weather protective cover is installed above said fuel storage means to shield said fuel storage means from the elements.

5. A service station as set forth in claim 4 including vapor detector means disposed in the space between said bladder type tank and said cover to detect any fuel leaks in said bladder type tank.

6. A service station for dispensing fuel to vehicles, said service station being of the type having an overhead canopy covering the area where fuel is being dispensed from fuel dispenser to said vehicles characterized in that the fuel to be dispensed by said dispensers is stored in one or more self-contained, flexible, collapsible bladder type tanks constructed of tear and puncture resistant rubberized material and supported at an elevated position within said canopy, said bladder type tanks being removably disposed within at least one open top containment vessel which is also supported within said canopy, said containment vessel being capable of containing any fuel leakage from said storage tanks due to any puncture therein.

7. A service station as set forth in claim 6 in which said canopy totally surrounds said bladder type tanks and containment vessel, vapor detection means being installed in said canopy to detect any fuel leakage from said bladder type tanks.

* * * * *